UNITED STATES PATENT OFFICE.

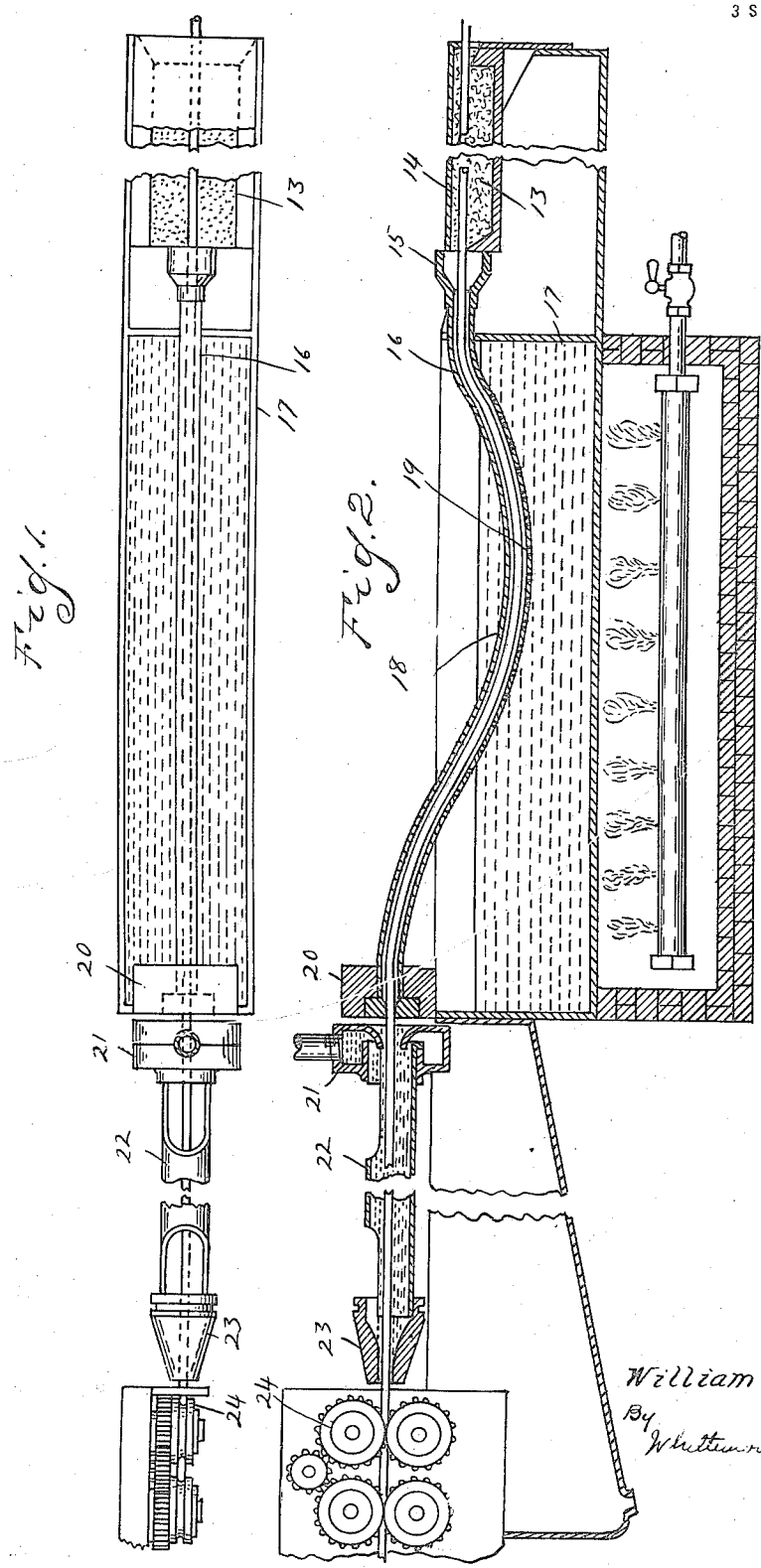

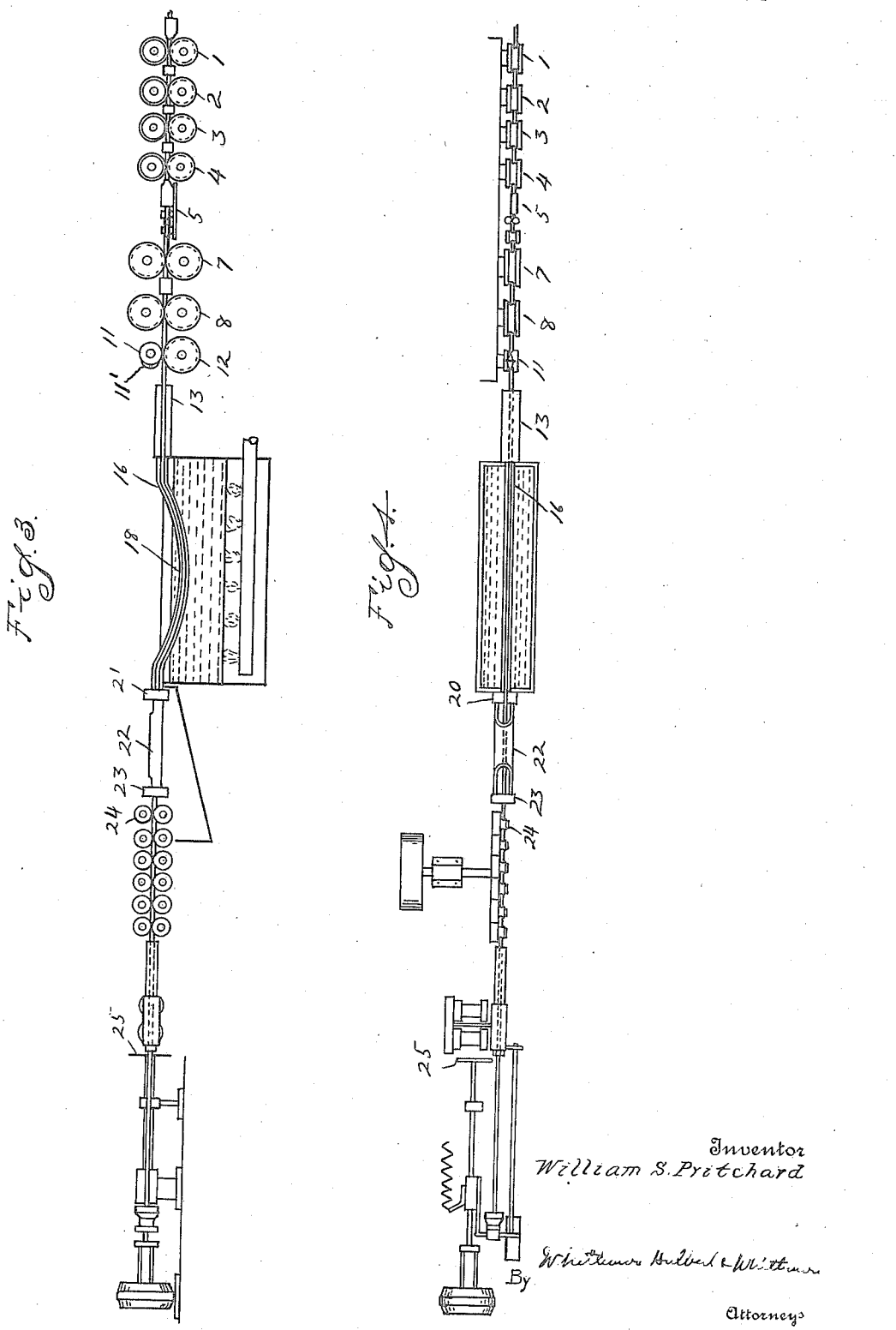

WILLIAM S. PRITCHARD, OF DETROIT, MICHIGAN, ASSIGNOR TO MOTOR PRODUCTS CORPORATION, OF DETROIT, MICHIGAN, A CORPORATION OF NEW YORK.

METHOD AND MACHINE FOR SOLDERING TUBING.

1,424,181.      Specification of Letters Patent.      Patented Aug. 1, 1922.

Application filed March 24, 1919, Serial No. 284,744. Renewed March 31, 1922. Serial No. 548,524.

*To all whom it may concern:*

Be it known that I, WILLIAM S. PRITCHARD, a citizen of the United States of America, residing at Detroit, in the county of Wayne and State of Michigan, have invented certain new and useful Improvements in Methods and Machines for Soldering Tubing, of which the following is a specification, reference being had therein to the accompanying drawings.

The invention relates to the manufacture of seamed tubing from sheet metal strips and has more particular reference to the means employed for soldering the seam.

In the present state of the art it is usual to solder the seams by dipping short length sections of the tubing in a soldering bath. This has the disadvantage of coating the inner surface of the tube as well as the outer surface with solder, and which is both wasteful and has a tendency to obstruct the tube. With the present invention the seam is soldered during the continuous advancement of the tubing by deflecting the same in one point in its advancement beneath the surface of a soldering bath.

In the drawings:

Figure 1 is a plan view;

Figure 2 is a vertical longitudinal section through the tube seam soldering apparatus;

Figures 3 and 4 are diagrammatic views, respectively a vertical longitudinal section and a plan view of the entire tube-forming apparatus in which my improvements are incorporated;

Figure 5:
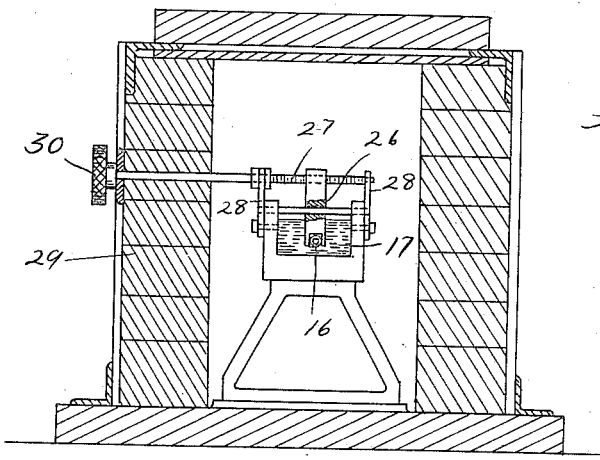
Figures 5 and 6 are respectively a cross-section and a vertical longitudinal section showing a modified construction.

The specific method and apparatus for forming the seamed tubing are not essential to the present invention, but as shown, 1, 2, 3 and 4 are forming rolls for successively fashioning and advancing a metallic strip; 5 is a closing die for completing the tube; 7 and 8 are rolls for assisting in maintaining the tube seam closed, the construction being such that a completely closed lock seamed tube is delivered from the rolls 8. This mechanism for forming tubing with a closed side seam may be any suitable apparatus as described and shown, for example, in Patent 950,163 issued February 22, 1910 to J. M. Webster, and in copending application, Serial No. 282,595, filed March 14, 1919 by Dwight B. Lee. Beyond this forming mechanism is arranged my improved soldering apparatus and beyond the latter is an automatic severing mechanism for cutting the tubing into short sections of predetermined length.

The soldering of the seam is effected by first fluxing and then passing through a bath of molten solder. The tube cannot, however, be passed in a straight line through the bath, inasmuch as it is necessary to immerse the same beneath the surface of the molten metal. Also provision must be made for properly guiding the forward end of the tube whenever a new strip of metal is passed through the apparatus, and this end must be closed so as to prevent the entrance of molten solder into the interior of the tube. I have, therefore, devised an apparatus in which the tubing after being delivered by the rolls 8, has its advancing end closed; is then guided through the fluxing device; then passes through a tubular guide, which is bent beneath the surface of the molten metal, and is finally washed, cooled and straightened before delivered to the severing apparatus.

In detail 11 and 12 are co-operating rotary dies which may be thrown into operation whenever an advanced end of tubing is to be closed. The specific construction of this device is not a part of the present invention, but in general the function performed is to press one side of the tubing into contact and conformity to the contour of the opposite side so as to close the end without enlarging the diameter, which is accomplished by means of the projecting portion 11' upon the periphery of the rotary die 11. This closing mechanism is shown in my copending application, Serial No. 282,593, filed March 14, 1919. 13 is a fluxing pad beneath the tubing, and 14 is a covering pad, which is preferably hinged so that it may be lifted when the advanced end of the tubing is passed therebeneath. 15 is the flaring mouth of a guide for receiving the end of the tubing beyond the fluxing device, and 16 is a tubular extension of the guide which passes over the end of a solder receptacle 17 and is then deflected downward beneath the surface of the molten metal, as indicated at 18. This downwardly deflected portion is perforated, as at 19, to receive the molten metal and to permit it to completely envelope the tubing within the guide. The rear end of the guide is again bent upward and terminates in a stripping die 20 which scrapes off the surplus adhering solder. 21 is an annular water spraying device surrounding the tubing. 22 is a tubular water holding receptacle adjacent to the annular member 21 which is filled with water for washing and cooling the tubing. 23 is a conical end of the washing device from which the advancing tubing is delivered into a series of straightening rolls 24. These are so arranged that after the tubing is passed therethrough it will be substantially straight and in condition for severing into short lengths by suitable severing apparatus 25 as, for example, that described and shown in Patent 1,367,564, issued February 8, 1921 to W. S. Pritchard.

In operation whenever a new strip is passed through the machine after being formed into the seamed tubing and delivered from the rolls 8, dies 11 and 12 are manipulated to close the end, and the tubing still advancing passes first through the fluxing apparatus, then through the flaring guide 15 and is then compelled to follow around the depressed tubular guide 18 through the molten solder, which provides access to the surface of the tubing through the perforations 19 in the guide. On passing out from the bath, the tubing still advancing is washed and cooled by the devices 21 and 22, is straightened by the rolls 24, which have a slightly greater surface speed than the forming rolls, and finally is severed by 25 into short sections of predetermined length. When once in full operation, the advancement is continuous for the entire length of the strip, and, if desired, successive strips may be attached to each other so as to prevent any interruption. Thus the soldering is effected thoroughly and expeditiously and the saving effected by excluding the solder from the inner surface of the tube is material.

Figure 6:
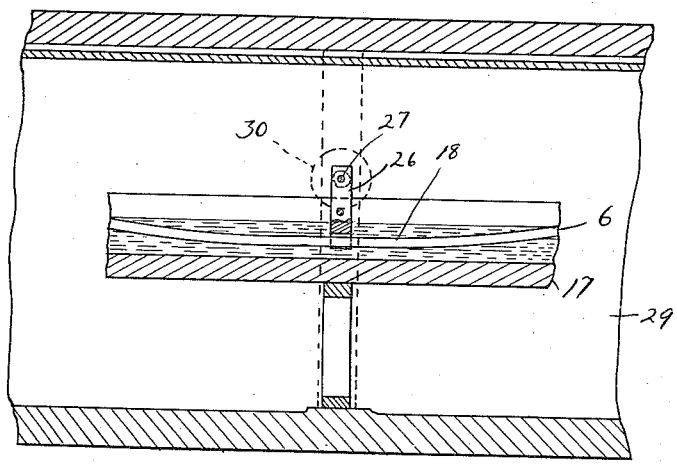

When the apparatus is in use the heat which is transmitted to the guide tube 18 from the molten metal will sometimes cause a bending or skewing of this tube, which interferes with the passage of the tubing. To guard against this result I have provided means operable from outside the apparatus for adjusting the position of the guide tube 18 in the molten bath of solder. This, as shown in Figures 5 and 6, comprises an arm 26 extending downward into the bath and at its lower end embracing the guide tube 18 near the central portion thereof. This arm 26 is mounted upon a threaded rod 27 which is journaled in bearings 28 at the sides of the tank or receptacle 17, the shank of said rod passing through the heat insulating wall 29 and being provided at its outer end with an adjusting handle 30. By means of this mechanism whenever the guide tube becomes misplaced it can be adjusted by turning the handle 30 and thereby brought back to the proper position.

What I claim as my invention is:

1. The method of forming soldered seamed tubing, comprising the advancement of a metallic strip, forming and closing said strip into a tube during such advancement, closing the forward end of the tubing, depressing the advancing tubing beneath the surface of a solder bath, straightening the soldered tubing, and severing into predetermined lengths.

2. In a metallic tube-forming machine, a series of forming rolls and die for continuously advancing a metallic strip and forming the same into a closed tube, a soldering bath, means for deflecting and guiding the formed tubing through said soldering bath, and a series of rolls for straightening the soldered tubing, said rolls being driven at slightly greater surface speed than said forming rolls and co-operating therewith to advance the strip with cumulative force.

3. In a metallic tube-forming machine, the combination with means for advancing a metallic strip and forming the same into closed tubing, of a soldering bath, and means for deflecting the advancing tubing to depress the same into said soldering bath, cooling means for the soldered tubing and straightening means therefor.

4. In a metallic tube-forming machine, the combination with means for forming and delivering closed metallic tubing, of a soldering bath in advance thereof, a tubular guide for deflecting the advancing tubing beneath the solder and out therefrom, solder stripping means, tube-cooling means and straightening rolls.

5. In a metallic tube-forming machine, the combination of means for forming and delivering closed tubing, a soldering bath, means for deflecting the advancing tubing into said soldering bath and out therefrom, cooling means, straightening rolls and means operating without interference to the continuous advancement of the tubing for severing the same.

6. In a metallic tube-forming machine, the combination with means for delivering metallic tubing, of a solder bath, a tubular guide for receiving the end of said tubing, the forward and rear ends of said guide being above the level of the solder, and the intermediate portion being depressed beneath the level of the solder and perforated to receive the same.

7. In a metallic tube-forming machine, the combination with means for delivering metallic tubing, of a solder bath, a tubular guide for receiving the end of said tubing, the forward and rear ends of said guide being above the level of the solder and the intermediate portion being depressed beneath the level of the solder and perforated to receive the same, and means engaging said tubular guide for adjusting the same laterally.

8. In a metallic tube-forming machine, the combination with means for delivering metallic tubing, of a solder bath, a tubular guide for receiving the end of said tubing passing over the ends of said solder bath, and the central portion of said guide being depressed beneath the level of the solder and being perforated to admit the solder thereinto, a heat insulating casing for enclosing said bath, and means operable from outside said heat insulating casing for adjusting said guide tube in said bath.

9. The method of forming soldered seamed tubing, comprising the advancement of a metallic strip, forming and closing said strip into a tube during such advancement, and the deflection of the advancing tubing at one point in its advancement beneath the surface of molten solder.

10. In a tube-forming machine, the combination with means for forming and delivering closed tubing, of a soldering bath in advance thereof, means for deflecting the advancing tubing into said soldering bath beneath the surface of the solder and out therefrom, and means operating without interference to the continuous advancement of the tubing for severing the same into predetermined lengths.

11. The method of forming soldered lock-seam tubing comprising the continuous advancement of a flat metallic strip of indeterminate length, forming and closing said strip into a lock-seam tube during such advancement, and deflecting the lock-seam tube to bring the lock-seam into intimate contact with molten solder.

12. The method of forming soldered lock-seam tubing comprising the continuous advancement of a flat metallic strip, forming and closing said strip into a lock-seam tube during such advancement, deflecting the advancing lock-seam tube to bring the lock-seam of the tube into intimate contact with molten solder, deflecting the solder lock-seam tube away from the molten solder, and severing the soldered lock-seam tube.

13. In a metallic tube forming machine, the combination with means for continuously advancing and forming a flat metallic strip into a lock-seam tube, of a solder bath, means for deflecting the lock-seam tube to bring the lock-seam into intimate contact with said solder bath, means for deflecting the soldered lock-seam tube away from said solder bath, and means for severing the lock-seam tube into predetermined lengths.

14. In a metallic tube forming machine, the combination with means for continuously advancing and forming a flat metallic strip into a lock-seam tube, of a solder bath in advance thereof, means for deflecting the lock-seam tube into said solder toward said solder bath to bring the lock-seam into intimate contact with the solder bath, means for deflecting the soldered lock-seam tube away from said solder bath, means for straightening the soldered lock-seam tube, and means for subsequently severing the soldered lock-seam tube into predetermined lengths.

In testimony whereof I affix my signature.

WILLIAM S. PRITCHARD.